April 21, 1925.
F. DOUCHET
1,534,695
ELECTRICAL JUNCTION BOX
Filed Sept. 2, 1924
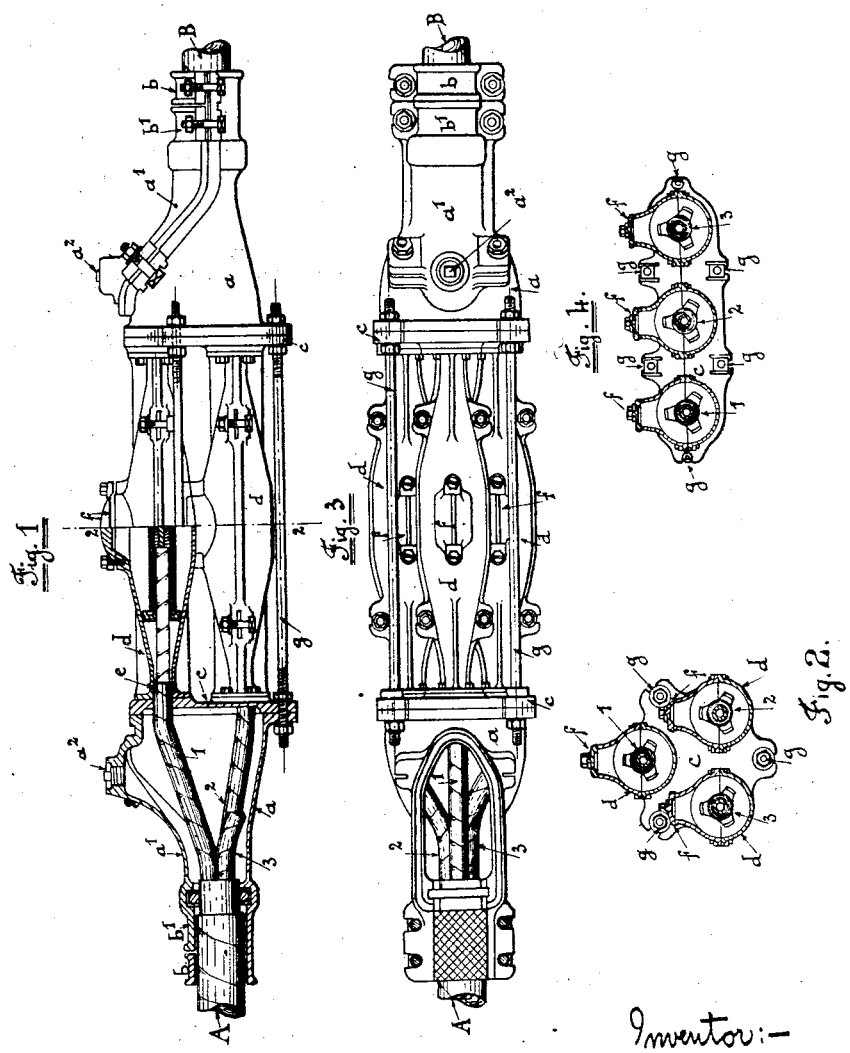
Inventor:-
Florimond Douchet,
By:- William A. Smith, Jr.,
Attorney.

Patented Apr. 21, 1925.

1,534,695

UNITED STATES PATENT OFFICE.

FLORIMOND DOUCHET, OF PARIS, FRANCE, ASSIGNOR TO FORGES & ATELIERS DE CONSTRUCTIONS ELECTRIQUES DE JEUMONT, SOCIETE ANONYME, OF PARIS, FRANCE.

ELECTRICAL JUNCTION BOX.

Application filed September 2, 1924. Serial No. 735,389.

*To all whom it may concern:*

Be it known that I, FLORIMOND DOUCHET, engineer, a citizen of the French Republic, and residing at 75 Boulevard Haussmann, Paris, France, have invented certain new and useful Improvements in Electrical Junction Boxes, of which the following is a specification.

This invention relates to electrical junction boxes and consists in a combination of accessory parts or elements specially arranged to provide an improved junction box for extra high tension multi-core cables, presenting the same advantages as single-core installations from the point of view of the internal electrical fields and of the dissipation of heat. The invention is especially intended for use with cables in which each core or conductor is covered with a continuous sheath or layer of metal, in which case it provides for the continuity of the metallic sheath and ensures better dispersion of heat.

The invention is however likewise applicable to cables with multiple conductors even if these latter are not covered with a continuous layer of metal.

Moreover, in the improved junction box the constituent parts are arranged in such a manner as to allow ready assembly and demounting, and they do not attain excessive dimensions even in apparatus of large size.

It is known that for three-core cables, for example, of which the working voltage exceeds twenty to twenty-five thousand volts, it has been necessary hitherto to give the junction box dimensions sufficiently great to resist flash-overs and to ensure complete safety in working. These dimensions involve the use of accessories of large size and of weight difficult to handle in the operations of mounting and demounting in case of accidents in working. The invention therefore remedies this serious disadvantage.

Upon the annexed drawing, to which reference is made in the subsequent description, there has been represented by way of example a junction box arranged in conformity with the invention, for cables with three cores or conductors, but it is understood that the number of conductors forming the cable may be any whatever.

In these drawings, Figure 1 is a longitudinal view of the junction box partly in section and partly in elevation.

Figure 2 is a transverse section of the same along the line 2—2 of Figure 1.

Figure 3 is a plan view of the assembled box.

Figure 4 is a transverse section of a modification.

The junction box is constituted by two cast iron shells, each formed in two parts held together by screws or bolts; the parts comprise a body $a$ and a kind of cover $a_1$ having a filler plug $a_2$ for the pouring in of suitable insulating material.

Each shell is mounted upon one of the cable-ends A B to be jointed, and fixed by means of collars $b$ $b_1$, of which one is fast to the cover $a_1$. The shell $a$ is closed by an apertured bronze plate $c$ upon which are secured by means of screws or bolts three bronze boxes $d$ forming deflectors and junction boxes proper for the conductors 1, 2, 3 respectively of the cables A B.

In the case of cables composed of conductors having continuous metallic sheathing, the metal coating is cut off or stopped at the neck $e$ of the box $d$, and its intimate contact with the body of the box is ensured at the time of assembly by a ribbon $h$ of soft alloy, for example lead-tin, interposed between the metallic sheathing of the conductor and the adjacent wall of the corresponding box $d$.

The boxes $d$ are made in two parts and assembled by means of screws or bolts; each of the boxes is moreover provided at its upper part with a detachable cover $f$ or with a screw-plug allowing it to be filled with suitable insulating material.

The internal electrical connections between the ends of the conductors 1, 2, 3 are effected as usual by thimbles or tubular connectors with or without insulation of the thimbles; insulating spacers may be inserted to maintain the jointed conductors in the axis of the box.

Steel distance pieces $g$ ensure the rigidity and parallelism of the system and allow the assembly and demounting of the structure. These distance pieces secure the plates $c$ carrying the boxes $d$ fast to the shells $a$.

The supporting surfaces of the shells $a$, bronze plates $c$ and box $d$ forming joints, are accurately worked and finished in such a way as to prevent leakage into or from the system.

It will be readily understood that the combination of the whole system described with reference to the annexed drawing, provides in reality three single-pole junction boxes arranged on the lines of an equilateral triangle, the examination of the individual boxes being therefore very easy.

There may also be obtained, without departing from the scope of the invention, a structure in which the boxes $d$ would be placed in a single horizontal plane. An arrangement of this kind is illustrated in Figure 4, in which the same reference characters designate similar parts to those shown in the previous figures.

Having thus described my invention, what I claim is:—

1. A junction box for multiple-core electrical cables, comprising a plurality of elementary boxes in parallel relation, means for connecting the ends of corresponding cores within said elementary boxes, a pair of shells secured at opposite extremities of said elementary boxes, and means for securing the respective cables to the outer ends of said shells, the individual cores diverging within said shells into alignment with the respective elementary boxes.

2. A junction box for multiple-core electrical cables, comprising a plurality of elementary junction boxes, means for connecting the ends of corresponding cores within said elementary boxes, a pair of shells mounted upon the respective cables, apertured plates closing the adjacent ends of said shells, and means for securing said shells, plates and boxes to form a rigid structure with the apertures in said plates aligned with said elementary boxes.

3. A junction box for multiple-core electrical cables, comprising elementary junction boxes to the number of the conducting cores in each cable, means for connecting the ends of corresponding cores of the two cables within said elementary boxes, a pair of shells secured at opposite extremities of said elementary boxes, means for securing the two cables in the outer ends of said shells, and means for separating the individual cores of said cables at the adjacent ends of said shells in alignment with the respective elementary boxes.

4. A junction box for electrical cables having a plurality of metal-sheathed cores, comprising a pair of divergent metal shells mounted upon the respective cables, a pair of apertured metal plates fitted to the adjacent ends of said shells, a plurality of metal boxes arranged between said plates in alignment with the apertures thereof, means for connecting the ends of corresponding cores within said boxes, and means for bonding the metal sheathing of said cores to the respective boxes.

5. A junction box for multiple-core electrical cables, comprising a plurality of elementary junction boxes, means for connecting the ends of corresponding cores within said boxes, said boxes being divided longitudinally and having filling apertures for the introduction of insulating material, means for securing together the halves of said boxes, means for closing said filling apertures, a pair of shells mounted at opposite ends of said boxes, detachable lids to said shells, means for securing the cables in the outer ends of said shells, apertured plates arranged between said shells with their apertures in alignment with the respective elementary boxes, and means for securing said shells, plates and boxes to form a rigid structure.

6. A junction box for multiple-core electrical cables, comprising a plurality of elementary junction boxes in parallel relation for the connection of individual cores, a pair of shells secured at opposite ends of said elementary boxes, the outer ends of said shells shaped to receive the respective cables, collars secured upon the outer ends of said shells to secure the cables thereto, detachable covers upon said shells, and means for securing said covers thereto, said securing means including collar members clamping upon the cables.

7. A junction box for multi-core electrical cables, comprising a plurality of elementary junction boxes, means for connecting the ends of corresponding cores within said boxes, a pair of apertured plates between said elementary boxes fitted in alignment with the respective apertures therein, a pair of shells fitted upon the outer sides of said apertured plates, means for securing the cables in the outer ends of said shells, the individual cores diverging within said shells into line with the respective apertures and elementary boxes, and screwed distance pieces securing said shells, plates and elementary boxes together to form a rigid structure.

8. A junction box for metal-sheathed multiple-core electrical cables, comprising a pair of metal shells mounted at one end upon the respective cables, a pair of apertured metal plates fitted to the other ends of said shells, a plurality of metal boxes arranged between said plates in parallel relation and in alignment with the apertures therein, means for connecting the ends of corresponding cores within said metal boxes, means for bonding the metal sheathing of the cables to said shells, and metallic distance pieces holding together said shells, plates and boxes to form a rigid structure and provide electrical continuity between the metal sheathing of the two cables.

In testimony whereof I have hereunto affixed my signature.

FLORIMOND DOUCHET.